United States Patent
McDonald, Jr. et al.

(10) Patent No.: US 10,744,959 B2
(45) Date of Patent: *Aug. 18, 2020

(54) PROTECTIVE LINER

(71) Applicants: Raymond Augustus McDonald, Jr., Pooler, GA (US); Dominic Plauche Grandominico, Columbus, OH (US); Gary Alan Grandominico, Galena, OH (US); Stuart Dailey, New Albany, OH (US); Crystal Hill, Columbus, OH (US); Bret Jameson Moss, Lewis Center, OH (US); Christopher J. Gelin, Chagrin Falls, OH (US)

(72) Inventors: Raymond Augustus McDonald, Jr., Pooler, GA (US); Dominic Plauche Grandominico, Columbus, OH (US); Gary Alan Grandominico, Galena, OH (US); Stuart Dailey, New Albany, OH (US); Crystal Hill, Columbus, OH (US); Bret Jameson Moss, Lewis Center, OH (US); Christopher J. Gelin, Chagrin Falls, OH (US)

(73) Assignee: Ridge Corporation, Pataskala ( * ) Notice: Subject to any disclaimer, the term of this patent is extended or adjusted under 35 U.S.C. 154(b) by 17 days.

This patent is subject to a terminal disclaimer.

(21) Appl. No.: 15/997,025

(22) Filed: Jun. 4, 2018

(65) Prior Publication Data
US 2018/0281700 A1    Oct. 4, 2018

Related U.S. Application Data

(63) Continuation of application No. 15/139,747, filed on Apr. 27, 2016, now Pat. No. 10,005,405.
(Continued)

(51) Int. Cl.
*B60R 13/01* (2006.01)

(52) U.S. Cl.
CPC ........ *B60R 13/01* (2013.01); *B60R 2013/018* (2013.01)

(58) Field of Classification Search
CPC . B60R 13/01; B60R 13/011; B60R 2013/015; B60R 2013/016; B60R 2013/018
(Continued)

(56) References Cited

U.S. PATENT DOCUMENTS 4,341,412 A * 7/1982 Wayne ............... B60R 13/01
296/39.2
4,673,207 A    6/1987 Reynolds et al.
(Continued)

FOREIGN PATENT DOCUMENTS

WO    2016176407 A1    11/2016

OTHER PUBLICATIONS

Written Opinion of the International Searching Authority dated Aug. 4, 2016 for related International Application No. PCT/US16/29699.
(Continued)

*Primary Examiner* — Gregory A Blankenship
(74) *Attorney, Agent, or Firm* — Walter Haverfield LLP; James J. Pingor

(57) ABSTRACT

A protective device for a cargo carrier is provided that includes a deflective portion disposed proximate to an intersection between a top surface of a cargo deck and an interior surface of a wall of a cargo carrying vehicle. The deflective portion includes a beveled part and a convex part connected to the beveled part that deflects objects from an interior surface of the wall of the cargo carrier.

17 Claims, 12 Drawing Sheets

Related U.S. Application Data

(60) Provisional application No. 62/153,620, filed on Apr. 28, 2015.

(58) Field of Classification Search
    USPC .................................. 296/186.1, 39.1, 39.2
    See application file for complete search history.

(56) References Cited

U.S. PATENT DOCUMENTS

| | | | | |
|---|---|---|---|---|
| 4,767,149 A | * | 8/1988 | Rye | B60R 13/01 |
| | | | | 224/403 |
| 4,893,862 A | | 1/1990 | Hollenbaugh, Sr. | |
| 5,221,119 A | | 6/1993 | Emery | |
| 5,308,133 A | * | 5/1994 | Mangum | B60R 13/01 |
| | | | | 24/295 |
| 5,492,747 A | | 2/1996 | Kemp et al. | |
| 5,755,481 A | * | 5/1998 | Emery | B60R 13/01 |
| | | | | 296/39.1 |
| 5,769,479 A | * | 6/1998 | Emery | B60R 13/01 |
| | | | | 296/39.2 |
| 5,927,785 A | * | 7/1999 | Cantrell | B60R 13/01 |
| | | | | 296/39.1 |
| 6,579,009 B1 | | 6/2003 | Schinasi | |
| 6,595,568 B1 | | 7/2003 | Schroeder et al. | |
| 10,005,405 B2 | * | 6/2018 | McDonald, Jr. | B60R 13/01 |
| 2007/0110944 A1 | | 5/2007 | Grandominico et al. | |
| 2013/0087656 A1 | | 4/2013 | Hoetzeldt | |
| 2016/0318460 A1 | * | 11/2016 | McDonald, Jr. | B60R 13/01 |

OTHER PUBLICATIONS

International Search Report from ISA/US dated Aug. 4, 2016 for related International Application No. PCT/US16/29699.

Office Action from the Canadian Intellectual Property Office dated Jul. 30, 2018 for related Canadian Application No. 2,984,321.

* cited by examiner

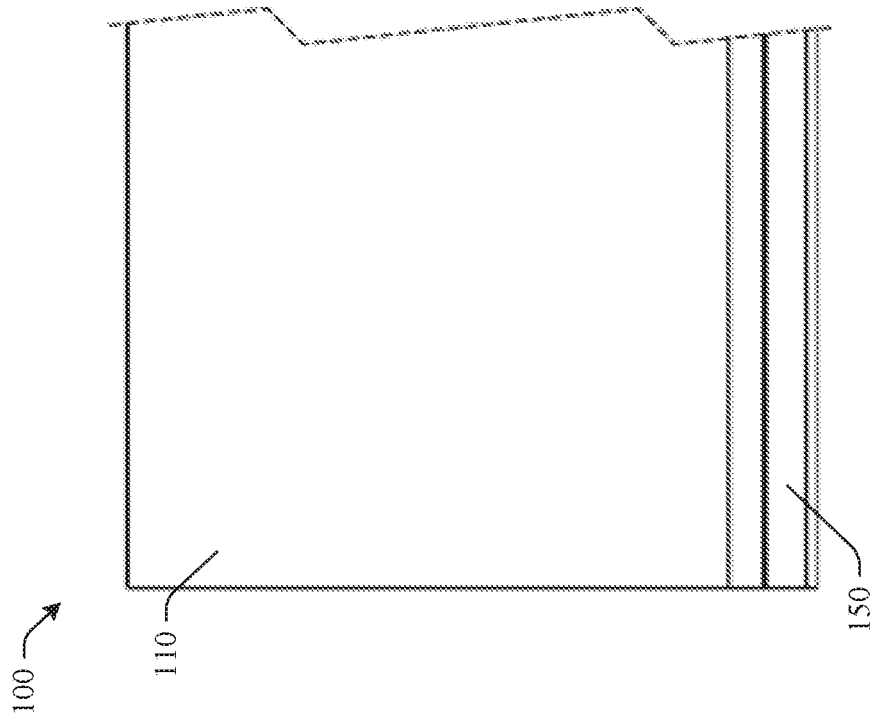

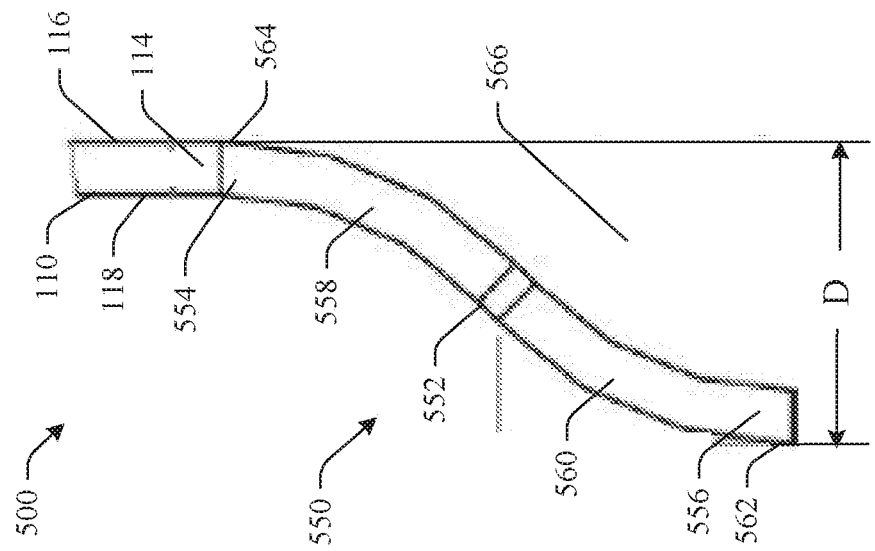
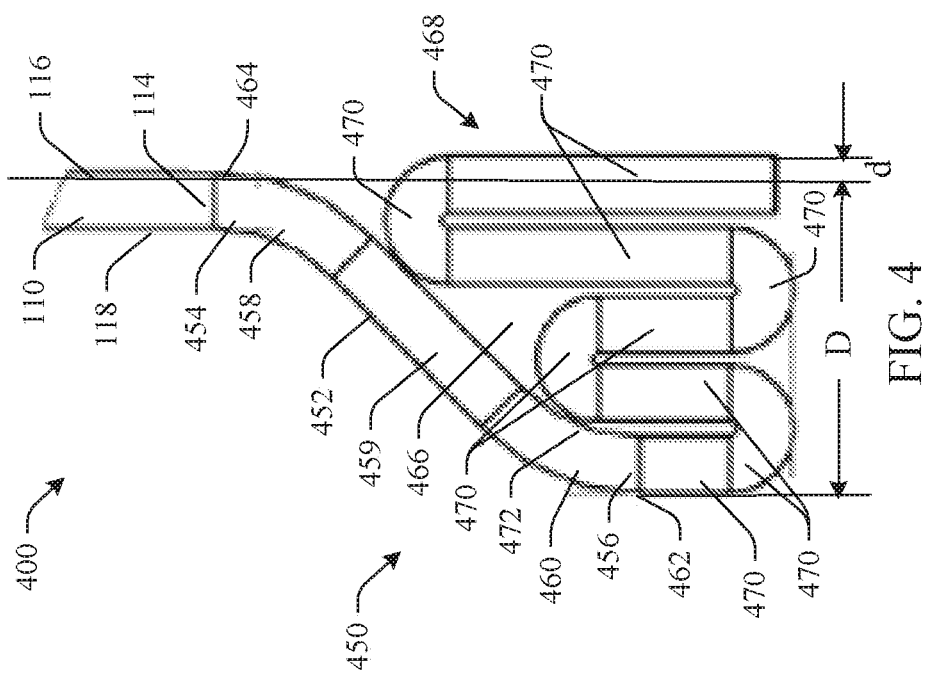

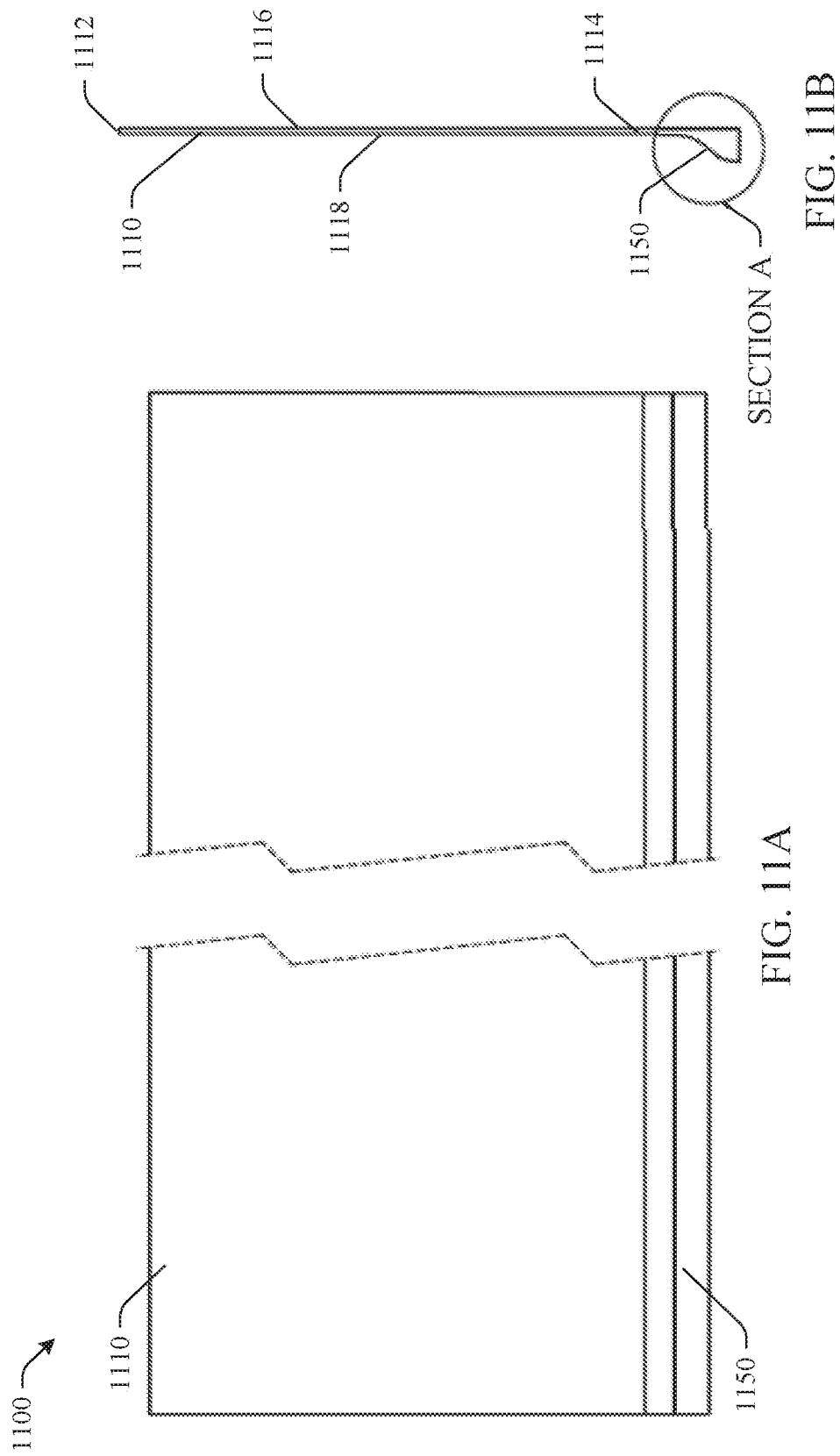

PROTECTIVE LINER

CROSS-REFERENCE TO RELATED APPLICATIONS

This application is a continuation of and claims priority to U.S. Non-Provisional patent application Ser. No. 15/139,747 entitled "PROTECTIVE LINER" filed on Apr. 27, 2016, which claims the benefit of U.S. Provisional Patent Application Ser. No. 62/153,620 entitled "Protective Liner" filed on Apr. 28, 2015. The entirety of the above-noted applications are incorporated by reference herein.

ORIGIN

The innovation disclosed herein relates to a cargo carrying vehicle and more specifically, to a protective liner/reinforcement panel disposed adjacent to an interior surface of a wall of the cargo carrying vehicle.

BACKGROUND

Scuff liner is a term used to generally describe a reinforcement panel that is installed within a cargo carrying vehicle (trailer, intermodal container, van body, rail car, etc.) that protects the interior wall from impacts/abrasion experienced during loading and unloading of freight. The scuff liners are constructed of various materials which can include steel, aluminum, wood, plastic, composite, etc. The materials have various geometries ranging from 18 Ga corrugated steel panels to thick slabs of wood that can be as thick as 1 inch. The design challenge associated with a scuff liner is centered on providing protection for the lower 12-48" of the wall while maintaining the widest dimension possible between the interior walls of the vehicle.

Traditionally, scuff liners have been designed with extra thickness to provide sacrificial material to endure collisions and abrasion between the objects (e.g. fork lift tines, wheels, etc.) and the scuff. Designing thicker sections of the scuff liner, however, reduces the available width between the interior walls of the vehicle as opposed to the thinner sections of the scuff liner. Design considerations, such as weight and cost, are a concern as well. For example, thicker sections adds weight, cost and reduces the available width mentioned above. In addition, the lighter the scuff the more freight can be hauled within the cargo carrying device.

Another concern, is that scuff liners become damaged in several different ways. For example, fork truck tines and pallets impact and damage the scuff liners during the loading and unloading processes. This damage can be a puncture/gouge via a tine or abrasion caused by pallets, tines, or fork truck wheels.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, a protective device for a cargo carrier is disclosed and includes a deflective portion configured to be removably attached to a wall of a cargo carrying vehicle, the deflective portion including: a first end, a second end, a beveled part near the first end, and a convex part near the second end and being connected to the beveled part, wherein an outer most portion of the deflective portion is offset from the first end thereby forming a void below the first end and adjacent to the convex part, and a reinforcement portion disposed in the void that provides reinforcement to the deflective portion.

In another aspect of the innovation, a protective liner for a cargo carrier is disclosed that includes a first portion that extends along an interior surface of the wall of the cargo carrier and having a first end and a second end, and a second portion disposed proximate to an intersection between a top surface of a cargo deck and the interior surface of the wall of the cargo carrier and having a curved portion and a support portion, wherein the curved portion includes a first end removably attached to the second end of the first portion and a second end offset from the first portion thereby forming a void below the first portion, and wherein the support portion is disposed in the void.

In still yet another aspect of the innovation, a protective liner for a cargo carrier is disclosed that includes a linear portion having a first end and a second end that extends along an interior surface of the wall of the cargo carrier, and a deflective portion integrally connected to the second end of the linear portion and is disposed proximate to an intersection between a top surface of a cargo deck and the interior surface of the wall of the cargo carrier, wherein the deflective portion has width such that an outer most portion of the deflective portion is horizontally offset from a first surface of the linear portion.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 1A is a front view of a first embodiment of an innovative liner in accordance with an aspect of the innovation.

FIG. 1B is a side view of the innovative liner in accordance with an aspect of the innovation.

FIGS. 2-10 are illustrations of alternate example embodiment of the second portion of the innovative liner of FIGS. 1A-1D in accordance with an aspect of the innovation.

FIG. 11A is a front view of another embodiment of an innovative liner in accordance with an aspect of the innovation.

FIG. 11B is a side view of the innovative liner in accordance with an aspect of the innovation.

DETAILED DESCRIPTION

Figure 1D:
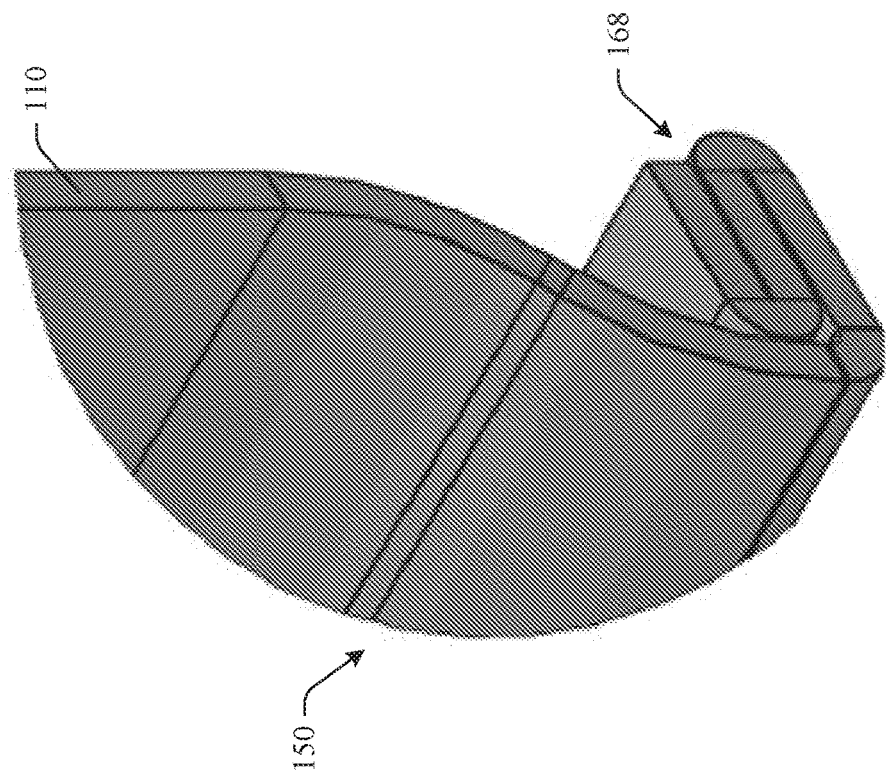
FIG. 1D is a perspective view of FIG. 1C of the innovative liner in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness), it is to be understood that the features, functions and benefits of the innovation can employ characteristics that vary from those described herein. These alternatives are to be included within the scope of the innovation and claims appended hereto.

Disclosed herein is a protective liner/reinforcement panel (hereinafter "liner") generally referred to as a scuff liner for use with a cargo carrying vehicle (trailer, intermodal container, van body, rail car, etc.) that overcomes the aforementioned concerns in accordance with an aspect of the innovation. The innovative liner includes an innovative bulb (bulb scuff) adapted to provide a means to reduce damage to the liner. For example, the liner is adapted to prevent damage by prohibiting an object, such as a rim of a fork truck wheel from contacting the liner, which also reduces abrasion damage caused by the rim. In other words, the innovative geometry of the liner works as a deflector providing contact between a tire tread and the bulb while maintaining space between the upper portion of the scuff and the steel rim of the fork truck tire. A bevel design re-routes the movement of the fork truck away from a cargo carrier wall. As the tread attempts to impact the "bulb", the resultant forces push the tire assemble away from the cargo carrier wall thus providing further protection for the scuff. While examples and embodiments disclosed and claimed herein are specific to cargo carrying vehicles, it is to be understood that other aspects can be used in land-based applications such as warehouses or the like where damage to walls from cargo moving equipment (e.g., fork trucks) is prevalent. These alternative aspects are to be considered within the scope of this disclosure and claims appended hereto without departing from the spirit and scope of the innovation.

For example, the liner and bulb addresses the root cause of damage caused to freight vehicles via the fork truck wheels. Most fork truck wheels have a steel inner wheel (rim) that supports an exterior rubber tread. The tread is beveled back under the rim thereby leaving the rim protruding out from the rubber surface. Most fork truck tires have a rubber tread that is approximately 0.5"-1.5" thick. In order to keep the steel rim from grinding/abrading on the scuff panel and causing damage, the bulb provides a geometry that forces contact between the rubber tread and the bulb prior to the rim impacting liner. The bulb is located in the lower 0.5-2" of the liner profile so it's low enough to engage the wheel tread while avoiding the rim. The vertical liner and/or the bulb geometry can be produced from aluminum extrusion, plastic extrusion, multi-piece assemblies, plastic, composite materials including fiber reinforced plastic, rolled formed steel, etc. Additionally, self-healing or otherwise resilient materials can be employed to further enhance advantages of the subject innovation. For example, resin based products or the like can be used that flex upon impact and regain their original shape upon alleviation of the impact can be employed in aspects. Processes can include thermoforming, extrusion, etc. More specifically, the vertical liner and the bulb geometry can be made from different materials and can be manufactured from different processes.

Figure 1C:
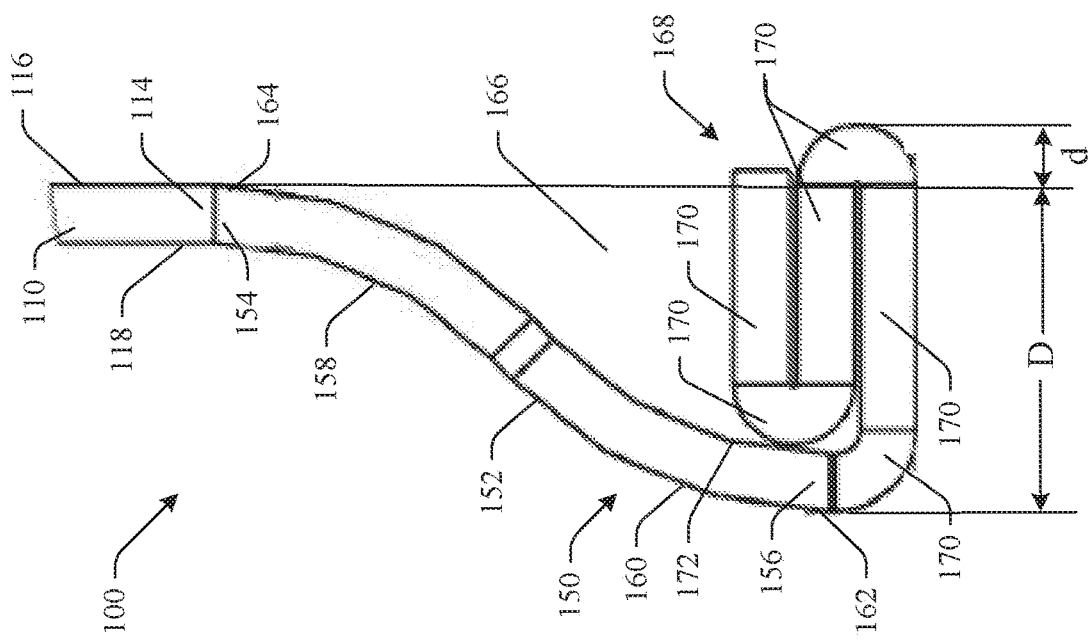
FIG. 1C is a close up view of Section A of FIG. 1B of the innovative liner in accordance with an aspect of the innovation.
Figure 1E:
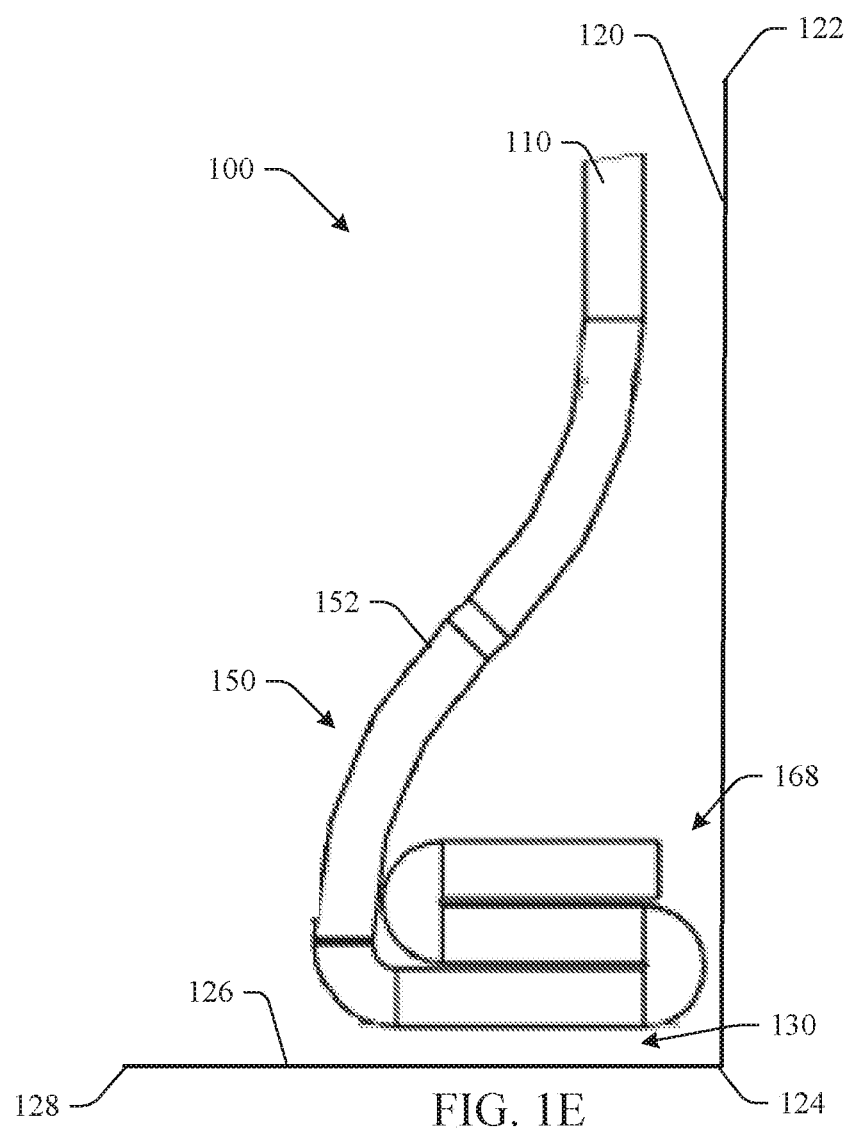
FIG. 1E shows the innovative protective liner disposed in a cargo carrier in accordance with an aspect of the innovation.

Referring now to the figures, FIGS. 1A-1E illustrates a first embodiment of an innovative protective device (protective liner) 100 that includes a first (upper, linear) portion 110 and a second (deflective, lower, curved, bulb) portion 150. FIG. 1A is a front view, FIG. 1B is a side view, FIG. 1C is a close up view of Section A of FIG. 1B, FIG. 1D is a perspective view of FIG. 1C, and FIG. 1E shows the innovative protective liner disposed in the cargo carrier. The first and second portions 110, 150 may be integrated, may be two separate units that attach to form a rigid structure, or may be two separate units.

The first portion 110 is linear but, may be curved or angled to conform to a contour of an interior surface 120 of a cargo carrier wall 122 (e.g., side, front, rear, etc.) and includes a first end 112, a second end 114, a first surface 116, and a second surface 118. When the liner 100 is installed, the first portion 110 extends along the interior surface 120 of the cargo carrier wall 122, toward a top of the cargo carrier wall such that the first surface 116 is adjacent to the interior surface 120 of the cargo carrier wall 122. In some embodiments, the first portion 110 may be attached or removably attached to the interior surface 120 of the cargo carrier wall 122.

The second portion 150 includes a curved portion 152 having a first end 154 and a second end 156. The curved portion 152 includes a beveled part 158 and a convex part 160 as the curved portion 152 extends from the first end 154 toward the second end 156. An outer most portion 162 of the curved portion 152 is offset a distance D from a first surface 164 of the first end 154 thereby forming a void 166 below the first end 154 adjacent to the convex part 160. In some embodiments, the first end 154 attaches (either integrally or removably) to the second end 114 of the first portion 110.

The second portion 150 further includes a support/reinforcement portion 168 disposed in the void 166. In this embodiment the support/reinforcement portion 168 is comprised of multiple connected segments 170 that may be linear (horizontal, vertical, angled) of varied lengths, curved, etc., which in this example embodiment, form an S-shape. The segments 170 may be an integrated or removably attached to the curved portion 152. Further the segments 170 may be integrated or removably attached to each other.

In this example embodiment, the support/reinforcement portion 168 extends in a horizontal direction from a first (inside) surface 172 of the convex part 160 beyond the first surface 164 of the first end 154 by a distance d. As with all the example embodiments disclosed herein, the second portion 150 provides support/reinforcement so as to minimize damage to the liner 100 when an object (e.g., wheel rim, fork lift tine, etc.) contacts the second portion 150 of the liner 100.

When installed, the second portion 150 is disposed adjacent (proximate) to an intersection 124 of a floor and the cargo carrier wall 122 of the cargo carrier, where the floor is a top surface 126 of a cargo deck 128 that supports the cargo and is generally perpendicular to the cargo carrier wall 122.

In one example embodiment, the second portion 150 may be attached or removably attached to the interior surface 120 of the cargo carrier wall 122.

It is to be understood that adjacent or proximate as defined herein can include that the second portion 150 may be in contact with the top surface 126 of the cargo deck 128 or may be spaced from the top surface 126 of the cargo deck 128 thereby creating a gap 130 between the second portion 150 and the top surface 126 of the cargo deck 128. Thus, in one example embodiment, the second portion 150 may contact the top surface 126 of the cargo carrier cargo deck 128. In another example embodiment, the second portion 150 may be spaced from the top surface 126 of the cargo deck 128 such that the second portion 150 is not in contact with the top surface 126 of the cargo deck 128, as shown in FIG. 1E. It is to be understood, that the embodiment illustrated in FIG. 1E is for illustrative purposes only and is not intended to limit the scope of the innovation.

FIGS. 2-10 are illustrations of alternate example embodiment of the innovative line in accordance with an aspect of the innovation. The first portion of the following embodiments are similar to the first portion 110 described above and illustrated in FIGS. 1A-1D. Thus, any reference to the first portion of the following embodiments will reference back to FIGS. 1A-1D and will use the same reference numbers. In addition, in regards to the second portion illustrated in FIGS. 2-15, the location of the second portion with respect to the cargo carrier floor when the protective liner is installed is similar to the example embodiment described above and illustrated in FIG. 1E. Thus, any reference to the location of the second portion will refer back to FIG. 1E and the above description and will not be repeated.

Figure 2:
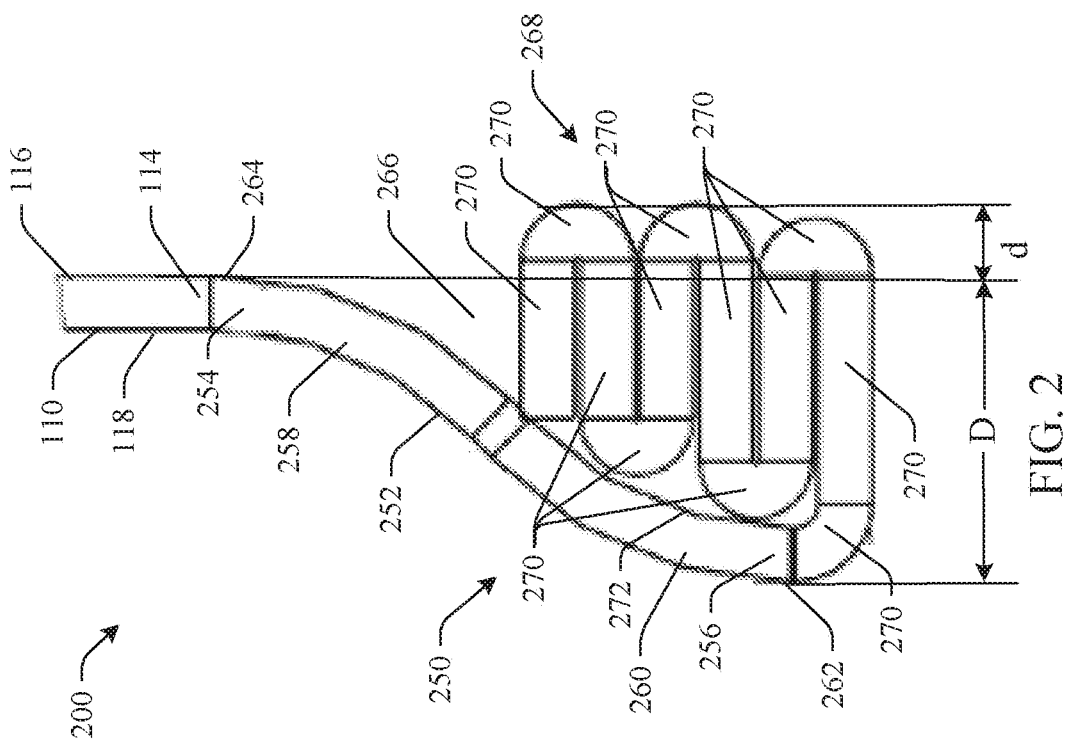

FIG. 2 is another example embodiment of an innovative protective device (protective liner) 200 in accordance with an aspect of the innovation. The liner 200 includes the first (upper, linear) portion 110 and a second (deflective, lower, curved, bulb) portion 250. As mentioned above, the first portion 110 is similar to the first portion 110 described above and, thus, details of the first portion 110 will not be repeated. The first and second portions 110, 250 may be integrated, may be two separate units that attach to form a rigid structure, or may be two separate units.

The second portion 250 is situated in the cargo carrier as described above and includes a curved portion 252 having a first end 254 and a second end 256. The curved portion 252 includes a beveled part 258 and a convex part 260 as the curved portion 252 extends from the first end 254 toward the second end 256. An outer most portion 262 of the curved portion 252 is offset a distance D from a first surface 264 of the first end 254 thereby forming a void 266 below the first end 254 adjacent to the convex part 260. In some embodiments, the first end 254 attaches (either integrally or removably) to the second end 114 of the first portion 110.

The second portion 250 further includes a support/reinforcement portion 268 disposed in the void 266. In this embodiment the support/reinforcement portion 268 is comprised of multiple connected segments 270 that may be linear (horizontal, vertical, angled) of varied lengths, curved, etc., which in this example embodiment, form a repeated S and backward S-shape. The segments 270 may be an integrated or removably attached to the curved portion 252. Further the segments 270 may be integrated or removably attached to each other. In this example embodiment, the support/reinforcement portion 268 extends in a horizontal direction from a first (inside) surface 272 of the convex part 260 beyond the first surface 264 of the first end 254 by a distance d.

Figure 3:
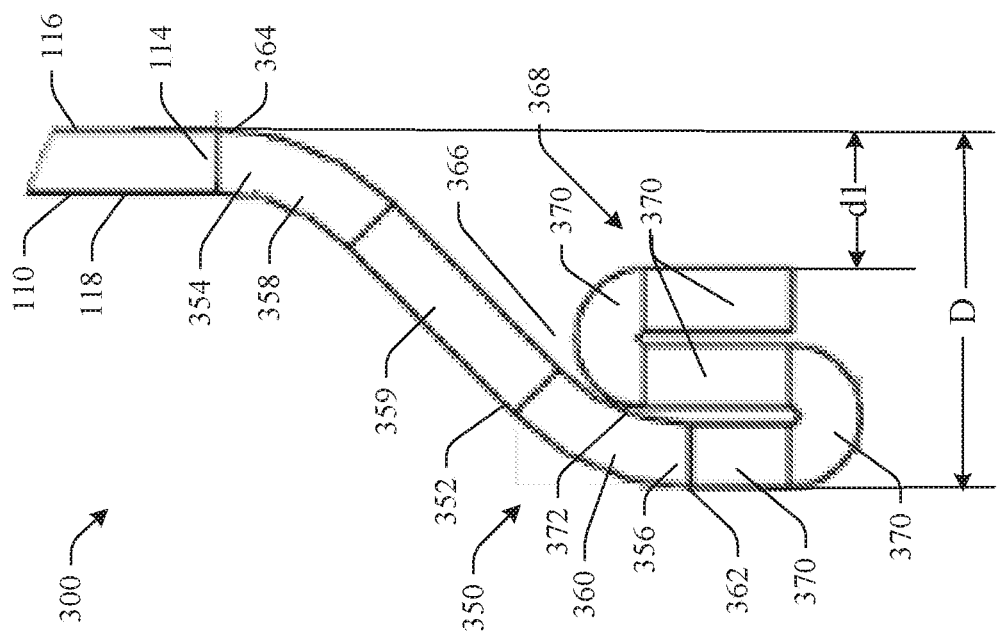

FIG. 3 is another example embodiment of an innovative protective device (protective liner) 300 in accordance with an aspect of the innovation. The liner 300 includes the first (upper, linear) portion 110 and a second (deflective, lower, curved, bulb) portion 350. As mentioned above, the first portion 110 is similar to the first portion 110 described above and, thus, details of the first portion 110 will not be repeated. The first and second portions 110, 350 may be integrated, may be two separate units that attach to form a rigid structure, or may be two separate units.

The second portion 350 is situated in the cargo carrier as described above and includes a curved portion 352 having a first end 354 and a second end 356. The curved portion 352 includes a beveled part 358, a linear part 359, and a convex part 360 as the curved portion 352 extends from the first end 354 toward the second end 356. An outer most portion 362 of the curved portion 352 is offset a distance D from a first surface 364 of the first end 354 thereby forming a void 366 below the first end 354 adjacent to the convex part 360. In some embodiments, the first end 354 attaches (either integrally or removably) to the second end 114 of the first portion 110.

The second portion 350 further includes a support/reinforcement portion 368 disposed in the void 366. In this embodiment the support/reinforcement portion 368 is comprised of multiple connected segments 370 that may be linear (horizontal, vertical, angled) of varied lengths, curved, etc., which in this example embodiment, form a repeated U and upside down U-shape. The segments 370 may be an integrated or removably attached to the curved portion 352. Further the segments 370 may be integrated or removably attached to each other. In this example embodiment, the support/reinforcement portion 368 extends in a horizontal direction from a first (inside) surface 372 of the convex part 360 short of the first surface 364 of the first end 354 by a distance d1.

FIG. 4 is another example embodiment of an innovative protective device (protective liner) 400 in accordance with an aspect of the innovation. The liner 400 includes the first (upper, linear) portion 110 and a second (deflective, lower, curved, bulb) portion 450. As mentioned above, the first portion 110 is similar to the first portion 110 described above and, thus, details of the first portion 110 will not be repeated. The first and second portions 110, 450 may be integrated, may be two separate units that attach to form a rigid structure, or may be two separate units.

The second portion 450 is situated in the cargo carrier as described above and includes a curved portion 452 having a first end 454 and a second end 456. The curved portion 452 includes a beveled part 458, a linear part 459, and a convex part 460 as the curved portion 452 extends from the first end 454 toward the second end 456. An outer most portion 462 of the curved portion 452 is offset a distance D from a first surface 464 of the first end 454 thereby forming a void 466 below the first end 454 adjacent to the convex part 460. In some embodiments, the first end 454 attaches (either integrally or removably) to the second end 114 of the first portion 110.

The second portion 450 further includes a support/reinforcement portion 468 disposed in the void 466. In this embodiment the support/reinforcement portion 468 is comprised of multiple connected segments 470 that may be linear (horizontal, vertical, angled) of varied lengths, curved, etc., which in this example embodiment, form a repeated U and upside down U-shape. The segments 470 may be an integrated or removably attached to the curved portion 452. Further the segments 470 may be integrated or removably attached to each other. In this example embodiment, the support/reinforcement portion 468 extends in a horizontal direction from a first (inside) surface 472 of the convex part 460 beyond the first surface 464 of the first end 454 by a distance d.

FIG. 5 is another example embodiment of an innovative protective device (protective liner) 500 in accordance with an aspect of the innovation. The liner 500 includes the first (upper, linear) portion 110 and a second (deflective, lower, curved, bulb) portion 550. As mentioned above, the first portion 110 is similar to the first portion 110 described above and, thus, details of the first portion 110 will not be repeated. The first and second portions 110, 550 may be integrated, may be two separate units that attach to form a rigid structure, or may be two separate units.

The second portion 550 is situated in the cargo carrier as described above and includes a curved portion 552 having a first end 554 and a second end 556. The curved portion 552 includes a beveled part 558 near the first end 554 and a convex part 560 near the second end 556 as the curved portion 552 extends from the first end 554 toward the second end 556. An outer most portion 562 of the curved portion 552 is offset a distance D from a first surface 564 of the first end 554 thereby forming a void 566 below the first end 554 adjacent to the convex part 560. In some embodiments, the first end 554 attaches (either integrally or removably) to the second end 114 of the first portion 110.

Figure 6:
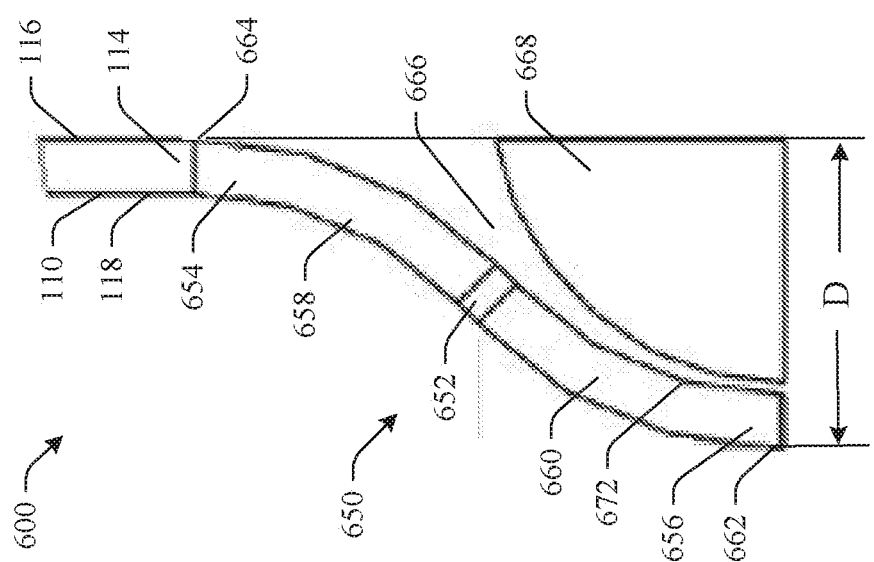

FIG. 6 is another example embodiment of an innovative protective device (protective liner) 600 in accordance with an aspect of the innovation. The liner 600 includes the first (upper, linear) portion 110 and a second (deflective, lower, curved, bulb) portion 650. As mentioned above, the first portion 110 is similar to the first portion 110 described above and, thus, details of the first portion 110 will not be repeated. The first and second portions 110, 650 may be integrated, may be two separate units that attach to form a rigid structure, or may be two separate units.

The second portion 650 is situated in the cargo carrier as described above and includes a curved portion 652 having a first end 654 and a second end 656. The curved portion 652 includes a beveled part 658 near the first end 654 and a convex part 660 near the second end 656 as the curved portion 652 extends from the first end 654 toward the second end 656. An outer most portion 662 of the curved portion 652 is offset a distance D from a first surface 664 of the first end 654 thereby forming a void 666 below the first end 654 adjacent to the convex part 660. In some embodiments, the first end 654 attaches (either integrally or removably) to the second end 114 of the first portion 110.

A support/reinforcement portion 668 disposed in the void 666 that may be integrated with the second portion 650, removably attached with the second portion 650, or may be an independent separate unit from the second portion 650. In this embodiment the support/reinforcement portion 668 is comprised of a triangular-shaped insert. In this example embodiment, the support/reinforcement portion 668 extends in a horizontal direction from a first (inside) surface 672 of the convex part 660 to a point essentially flush with the first surface 664 of the first end 654.

Figure 7:
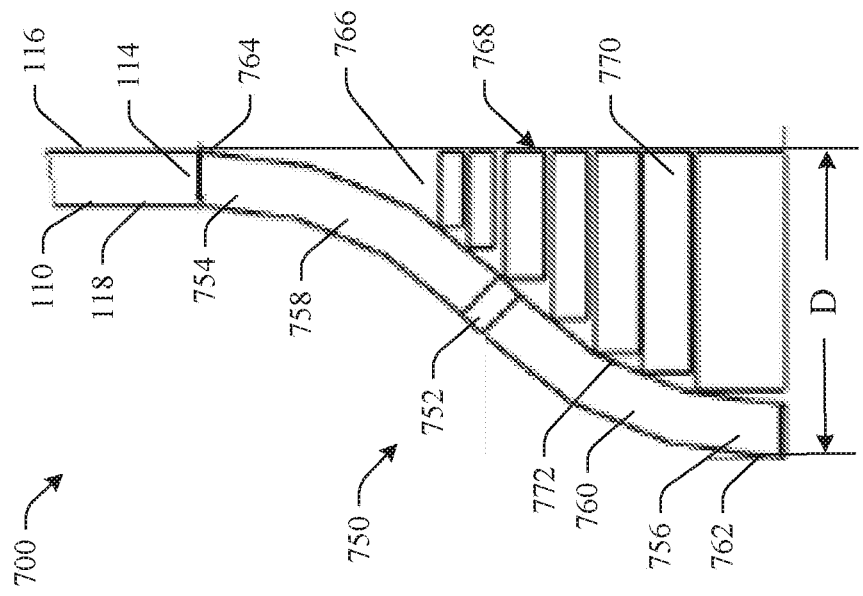

FIG. 7 is another example embodiment of an innovative protective device (protective liner) 700 in accordance with an aspect of the innovation. The liner 700 includes the first (upper, linear) portion 110 and a second (deflective, lower, curved, bulb) portion 750. As mentioned above, the first portion 110 is similar to the first portion 110 described above and, thus, details of the first portion 110 will not be repeated. The first and second portions 110, 750 may be integrated, may be two separate units that attach to form a rigid structure, or may be two separate units.

The second portion 750 is situated in the cargo carrier as described above and includes a curved portion 752 having a first end 754 and a second end 756. The curved portion 752 includes a beveled part 758 and a convex part 760 as the curved portion 752 extends from the first end 754 toward the second end 756. An outer most portion 762 of the curved portion 752 is offset a distance D from a first surface 764 of the first end 754 thereby forming a void 766 below the first end 754 adjacent to the convex part 760. In some embodiments, the first end 754 attaches (either integrally or removably) to the second end 114 of the first portion 110.

A support/reinforcement portion 768 disposed in the void 766 that may be integrated with the second portion 750, removably attached with the second portion 750, or may be an independent separate unit from the second portion 750. In this embodiment the support/reinforcement portion 768 is comprised of multiple substantially horizontal, linear segments 770 as an insert. The segments 770 may vary in length, thickness, width or a combination of the three. In addition, the segments 770 may be an integrated unit, may be removably attached with each other, or may be independent separate pieces. In this example embodiment, the support/reinforcement portion 768 extends in a horizontal direction from a first (inside) surface 772 of the convex part 760 to a point essentially flush with the first surface 764 of the first end 754.

Figure 8:
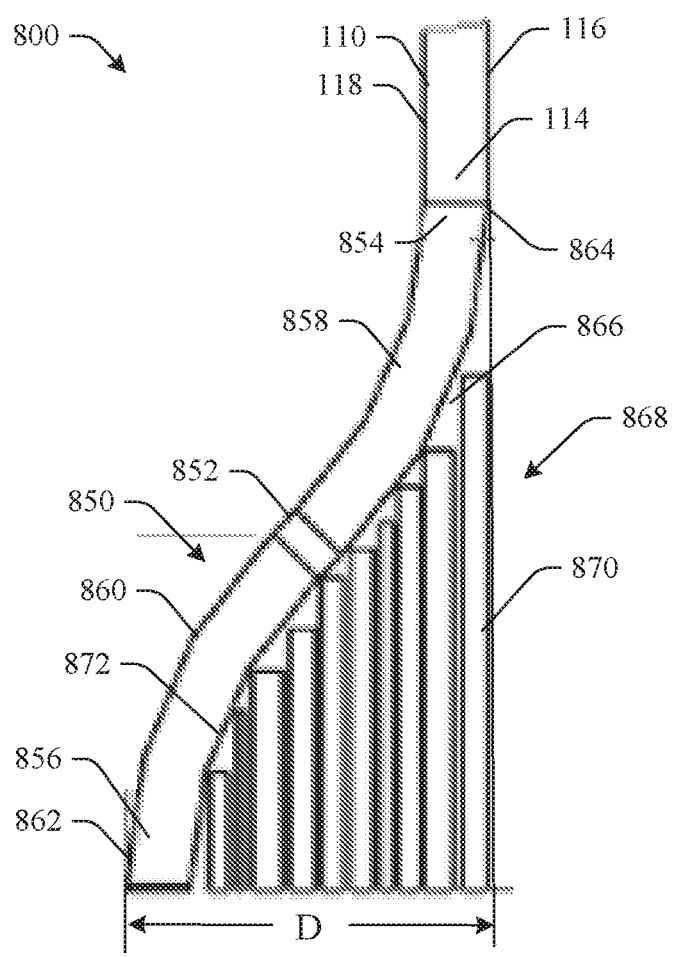

FIG. 8 is another example embodiment of an innovative protective device (protective liner) 800 in accordance with an aspect of the innovation. The liner 800 includes the first (upper, linear) portion 110 and a second (deflective, lower, curved, bulb) portion 850. As mentioned above, the first portion 110 is similar to the first portion 110 described above and, thus, details of the first portion 110 will not be repeated. The first and second portions 110, 850 may be integrated, may be two separate units that attach to form a rigid structure, or may be two separate units.

The second portion 850 is situated in the cargo carrier as described above and includes a curved portion 852 having a first end 854 and a second end 856. The curved portion 852 includes a beveled part 858 near the first end 854 and a convex part 860 near the second end 856 as the curved portion 852 extends from the first end 854 toward the second end 856. An outer most portion 862 of the curved portion 852 is offset a distance D from a first surface 864 of the first end 854 thereby forming a void 866 below the first end 854 adjacent to the convex part 860. In some embodiments, the first end 854 attaches (either integrally or removably) to the second end 114 of the first portion 110.

A support/reinforcement portion 868 disposed in the void 866 that may be integrated with the second portion 850, removably attached with the second portion 850, or may be an independent separate unit from the second portion 850. In this embodiment the support/reinforcement portion 868 is comprised of multiple substantially vertical, linear segments 870 as an insert. The segments 870 may vary in length, thickness, width or a combination of the three. In addition, the segments 870 may be an integrated unit, may be removably attached with each other, or may be independent separate pieces. In this example embodiment, the support/reinforcement portion 868 extends in a horizontal direction from a first (inside) surface 872 of the convex part 860 to a point essentially flush with the first surface 864 of the first end 854.

Figure 9:
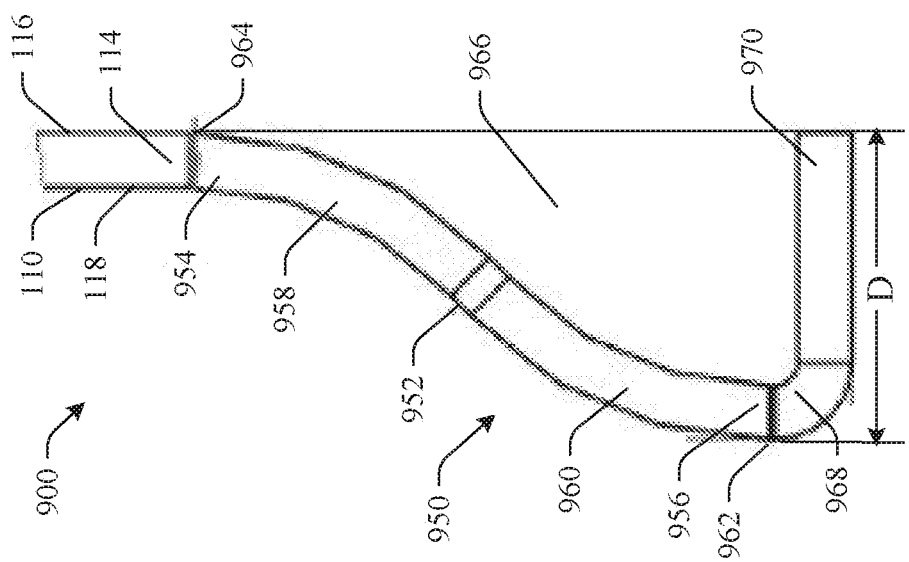

FIG. 9 is another example embodiment of an innovative protective device (protective liner) 900 in accordance with an aspect of the innovation. The liner 900 includes the first (upper, linear) portion 110 and a second (deflective, lower, curved, bulb) portion 950. As mentioned above, the first portion 110 is similar to the first portion 110 described above and, thus, details of the first portion 110 will not be repeated. The first and second portions 110, 950 may be integrated, may be two separate units that attach to form a rigid structure, or may be used independently of each other as two separate units.

The second portion 950 is situated in the cargo carrier as described above and includes a curved portion 952 having a first end 954 and a second end 956. The curved portion 952 includes a beveled part 958 near the first end 954 and a convex part 960 near the second end 956 as the curved portion 952 curves away from the first end 954 toward the second end 956. An outer most portion 962 of the curved portion 952 is offset a distance D from a first surface 964 of the first end 954 thereby forming a void 966 below the first end 954 adjacent to the convex part 960. In some embodiments, the first end 1954 attaches to the second end 114 of the first portion 110.

The second portion 950 further includes a support portion comprised of an angled portion 968 attached to the second end 956 of the curved portion 952 and a horizontal portion 970 attached to the angled portion 968 to thereby form an L-shape. In this example embodiment, the support portion extends in a horizontal direction from second end 956 of the curved portion 952 to a point essentially flush with the first surface 964 of the first end 954.

Figure 10:
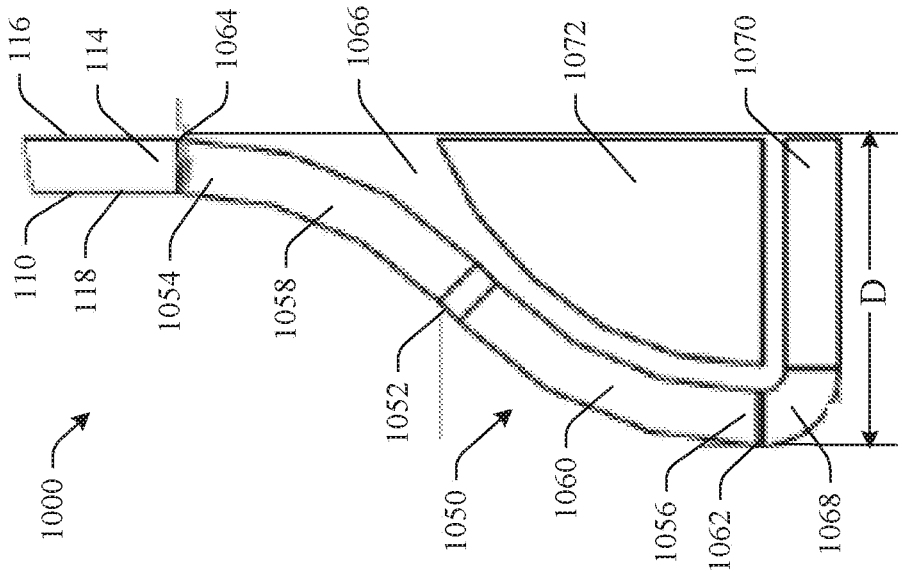

FIG. 10 is another example embodiment of an innovative protective device (protective liner) 1000 in accordance with an aspect of the innovation. The liner 1000 includes the first (upper, linear) portion 110 and a second (deflective, lower, curved, bulb) portion 1050. As mentioned above, the first portion 110 is similar to the first portion 110 described above and, thus, details of the first portion 110 will not be repeated. The first and second portions 110, 1050 may be integrated, may be two separate units that attach to form a rigid structure, or may be used independently of each other as two separate units.

The second portion 1050 is situated in the cargo carrier as described above and includes a curved portion 1052 having a first end 1054 and a second end 1056. The curved portion 1052 includes a beveled part 1058 near the first end and a convex part 1060 near the second end 1056 as the curved portion 1052 curves away from the first end 1054 toward the second end 1056. An outer most portion 1062 of the curved portion 1052 is offset a distance D from a first surface 1064 of the first end 1054 thereby forming a void 1066 below the first end 1054 adjacent to the convex part 1060. In some embodiments, the first end 1054 attaches to the second end 114 of the first portion 110.

The second portion 1050 further includes a support portion comprised of an angled portion 1068 attached to the second end 1056 of the curved portion 1052 and a horizontal portion 1070 attached to the angled portion 1068 to thereby form an L-shape. In this example embodiment, the support portion extends in a horizontal direction from second end 1056 of the curved portion 1052 to a point essentially flush with the first surface 1064 of the first end 1054.

A triangular-shaped insert (reinforcement part) 1072 is disposed in the void 1066 and resides on the support portion. The inert 1072 may be integrated with the second portion 1050, may be removably attached to the second portion 1050, or may be an independent separate unit from the second portion 1050. The insert 1074 provides additional support/reinforcement so as to minimize damage to the liner 1000 when an object (e.g., wheel rim, fork lift tine, etc.) contacts the second portion 1050 of the liner 1000.

Figure 11D:
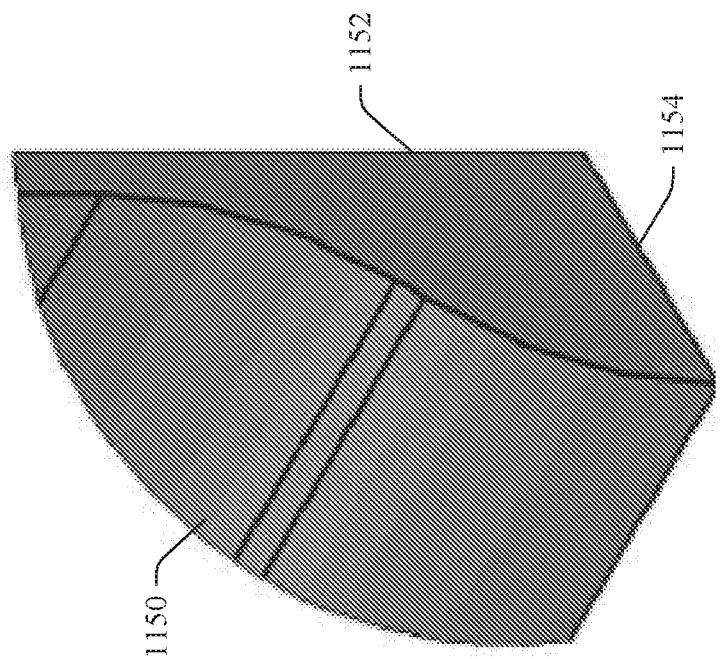
FIG. 11D is a perspective view of FIG. 11C of the innovative liner in accordance with an aspect of the innovation.
Figure 11C:
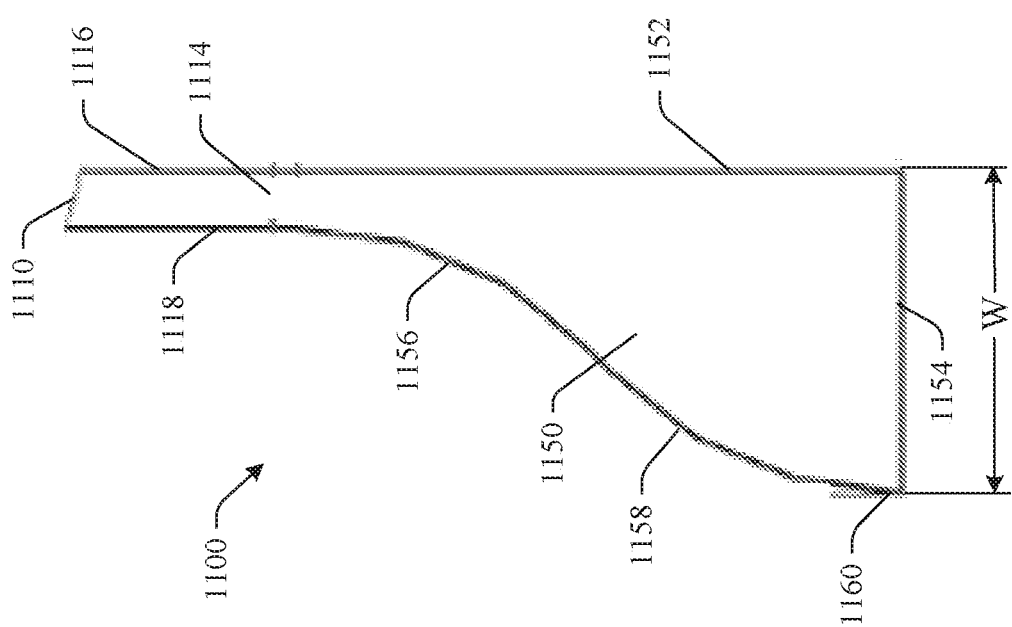
FIG. 11C is a close up view of Section A of FIG. 11B of the innovative liner in accordance with an aspect of the innovation.

FIGS. 11A-11D is an illustration of another example embodiment of an innovative protective device (protective liner) 1100 that includes a first (upper, linear) portion 1110 and a second (deflective, lower, curved, bulb) portion 1150 where the first and second portions 1110, 1150 are an integrated unit. FIG. 11A is a front view, FIG. 11B is a side view, FIG. 11C is a close up view of Section A of FIG. 11B, and FIG. 11D is a perspective view of FIG. 11C. In regards to the second portion illustrated in FIGS. 11-15, the location of the second portion with respect to the cargo carrier floor when the protective liner is installed is similar to the example embodiment described above and illustrated in FIG. 1E. Thus, any reference to the location of the second portion will refer back to FIG. 1E and the above description and will not be repeated.

The first portion 1110 is essentially linear but, may be curved or angled to conform to the contour of the cargo carrier, and includes a first end 1112, a second end 1114, a first surface 1116, and a second surface 1118. The first portion 1110 extends along and adjacent to an interior surface 120 of the cargo carrier wall 122 upward toward a top of the cargo carrier (see FIG. 1E).

The second portion 1150 is situated in the cargo carrier as described above and has a first substantially linear surface 1152, a base surface 1154, and a curved surface including a beveled part 1156 and a convex part 1158 that all form a curved triangular shape. The first surface 1116 of the first portion 1110 and the first surface 1152 of the second portion 1150 are flush and are adjacent to the interior surface 120 of the wall 122 of the cargo carrier. The base surface 1154 of the second portion 1150 has a width W (or is offset), as measured from an outer most portion 1160 of the second portion 1150 to the first surface 1152 of the second portion 1150. The offset along with the configuration of the beveled and convex part facilitates the prevention of damage to the liner 1100 by deflecting an object (e.g., wheel rim, fork lift tine, etc.) away from the interior surface 120 of the wall 122 of the cargo carrier.

FIGS. 12-15 are illustrations of alternate example embodiments of the innovative liner in accordance with an aspect of the innovation. The first portion of the following embodiments are similar to the first portion 1110 described above and illustrated in FIGS. 11A-11D. Thus, any reference to the first portion of the following embodiments will reference back to FIGS. 11A-11D and will use the same reference numbers.

Figure 12:
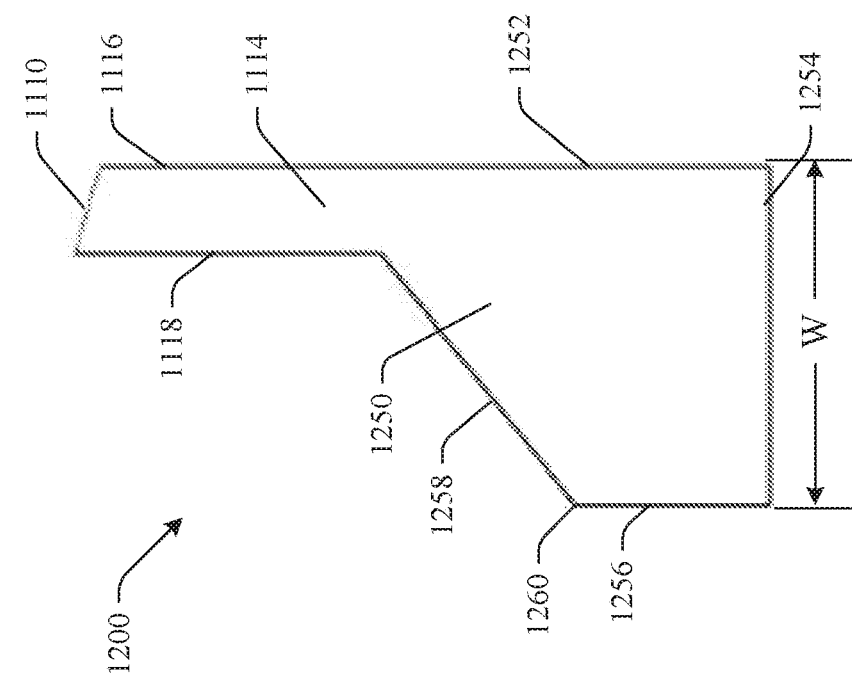

FIG. 12 is another example embodiment of an innovative protective device (protective liner) 1200 in accordance with an aspect of the innovation. The liner 1200 includes the first (upper, linear) portion 1110 and a second (deflective, lower, curved, bulb) portion 1250 where the first and second portions 1110, 1250 are an integrated unit. As mentioned above, the first portion 1110 is similar to the first portion 1110 described above and, thus, details of the first portion 1110 will not be repeated.

The second portion 1250 is situated in the cargo carrier as described above and has a substantially vertical-linear first surface 1252, a base surface 1254, a substantially vertical-linear second surface (linear part) 1256, and an angled third surface (angled/beveled part) 1258 that form a polygonal shape. The first surface 1114 of the first portion 1110 and the first surface 1252 of the second portion 1250 are flush and are adjacent to the interior surface of the cargo carrier. The second portion 1250 has a width W, as measured from an outer most portion 1260 of the second portion 1250 to the first surface 1114 of the first portion 1110. In this embodiment, the first surface 1252 and the second surface 1256 are substantially parallel and the third surface 1258 angles in a downward direction away from the second surface 1118 of the first portion 1110.

Figure 13:
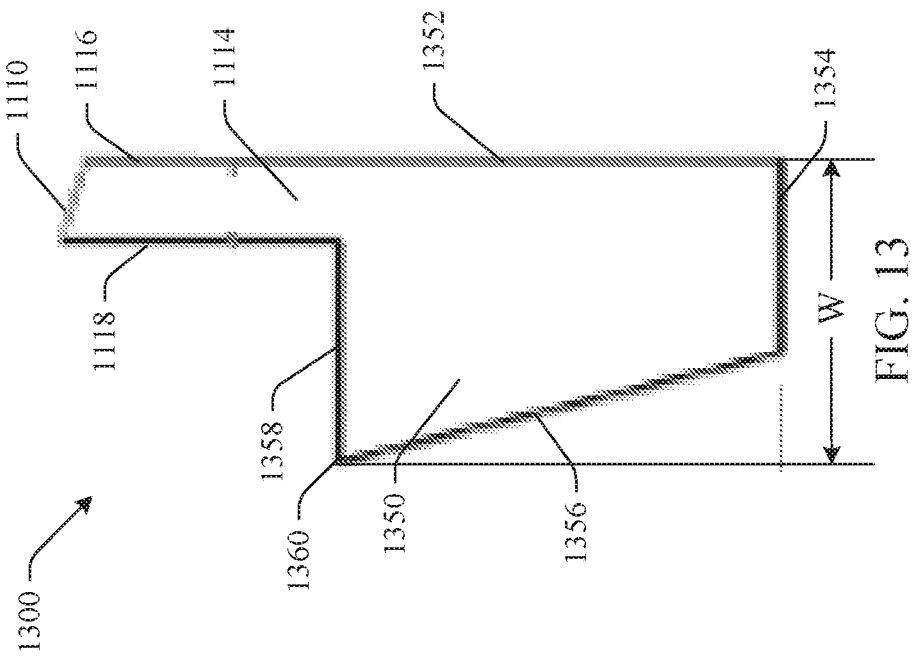
FIGS. 12-15 are illustrations of alternate example embodiment of the second portion of the innovative liner of FIGS. 11A-11D in accordance with an aspect of the innovation.

FIG. 13 is another example embodiment of an innovative protective device (protective liner) 1300 in accordance with an aspect of the innovation. The liner 1300 includes the first (upper, linear) portion 1110 and a second (deflective, lower, curved, bulb) portion 1350 where the first and second portions 1110, 1350 are an integrated unit. As mentioned above, the first portion 1110 is similar to the first portion 1110 described above and, thus, details of the first portion 1110 will not be repeated.

The second portion 1350 is situated in the cargo carrier as described above and has a substantially vertical-linear first surface 1352, a base surface 1354, an angled (angled/beveled part) surface 1356, and a substantially horizontal-linear third surface 1358 that form a polygonal shape. The first surface 1116 of the first portion 1110 and the first surface 1352 of the second portion 1350 are flush and are adjacent to the interior surface of the cargo carrier. The second portion 1350 has a width W, as measured from an outer most portion 1360 of the second portion 1350 to the first surface 1352 of the second portion 1350. In this embodiment, the third surface 1358 extends further away from the first surface 1116 of the first portion 1110 than the base 1354. Thus, the angled surface 1356 angles toward the first surface 1116 as the angled surface 1356 extends from the third surface 1358 to the base surface 1354. As a result, the outer most portion 1360 is at a point at an end of the third surface 1358 and not at the base 1314 as in other embodiments disclosed herein.

Figure 14:
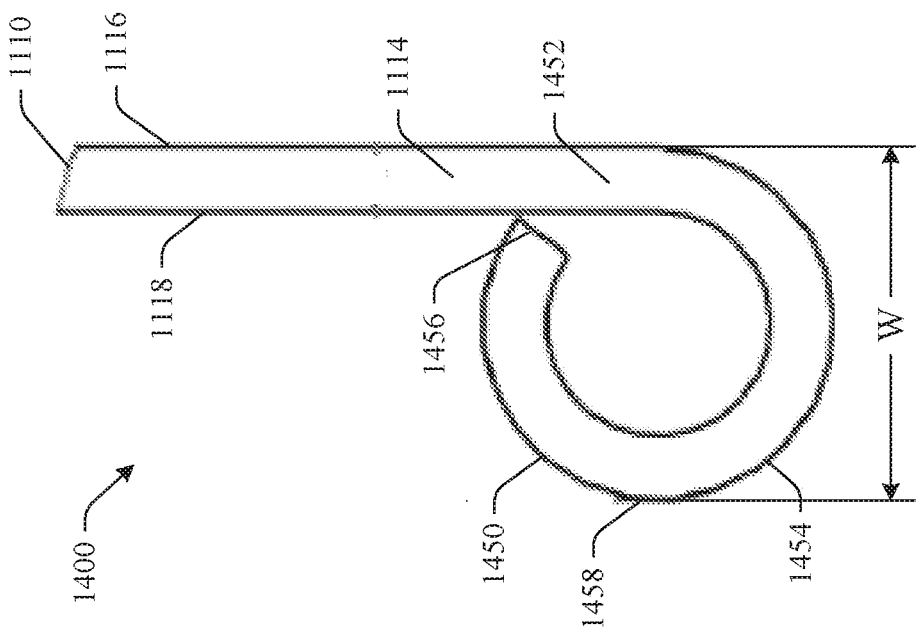

FIG. 14 is another example embodiment of an innovative protective device (protective liner) 1400 in accordance with an aspect of the innovation. The liner 1400 includes the first (upper, linear) portion 1110 and a second (deflective, lower, curved, bulb) portion 1450 where the first and second portions 1110, 1450 are an integrated unit. As mentioned above, the first portion 1110 is similar to the first portion 1110 described above and, thus, details of the first portion 1110 will not be repeated.

In this example embodiment, the second portion 1450 is situated in the cargo carrier as described above and has a circular or rounded shape and includes a first end 1452 that attaches to the second end 1114 of the first portion 1110, a curved portion 1454 that has a circular shape, and a second end 1456 that terminates the curved portion 1454 at a point adjacent to the second surface 1118 of the first portion 1110. The second portion 1450 has a width W, as measured from an outer most portion 1458 of the second portion 1450 to the first surface 1116 of the first portion 1110.

Figure 15:
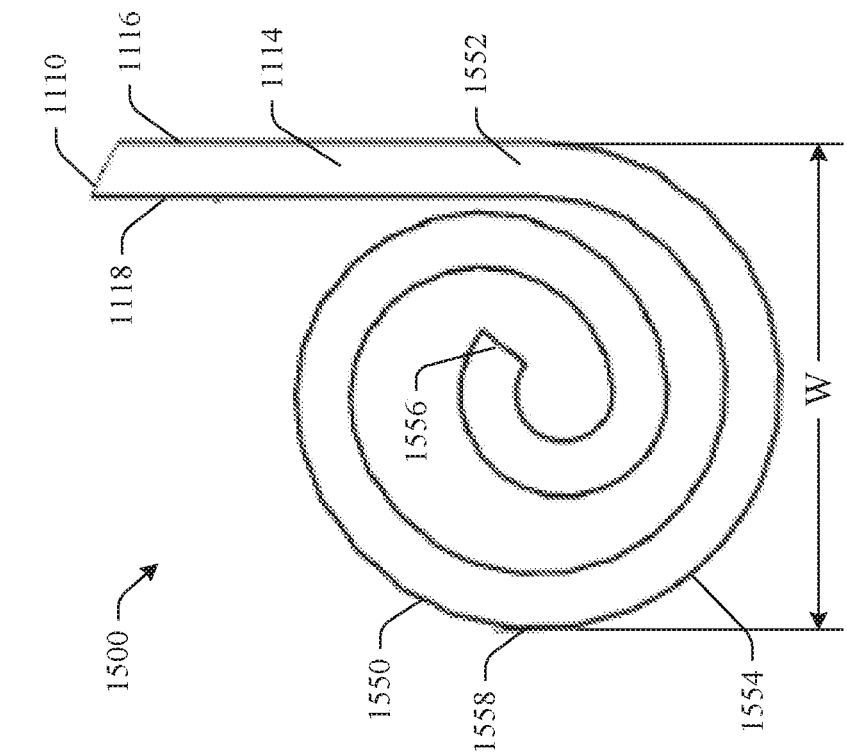

FIG. 15 is another example embodiment of an innovative protective device (protective liner) 1500 in accordance with an aspect of the innovation. The liner 1500 includes the first (upper, linear) portion 1110 and a second (deflective, lower, curved, bulb) portion 1550 where the first and second portions 1110, 1550 are an integrated unit. As mentioned above, the first portion 1110 is similar to the first portion 1110 described above and, thus, details of the first portion 1110 will not be repeated.

In this example embodiment, the second portion 1550 is situated in the cargo carrier as described above and has a continuous swirl like shape includes a first end 1552 that attaches to the second end 1114 of the first portion 1110, a curved portion 1554 that has a circular/swirl shape, and a second end 1556 that terminates the curved portion 1554 at a point within the circular/swirl shape. The second portion 1550 has a width W, as measured from an outer most portion 1558 of the second portion 1550 to the first surface 1114 of the first portion 1110.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A protective device for a cargo carrier comprising:
   a deflective portion including:
      a first end;
      a second end;
      a beveled part near the first end; and
      a convex part near the second end and being connected to the beveled part, wherein an outer most portion of the deflective portion is offset from the first end; and
   a reinforcement portion that provides reinforcement to the deflective portion, wherein the deflective portion and the reinforcement portion are attachable to form a rigid structure.

2. The protective device of claim 1, wherein the second end of the deflective portion and the reinforcement portion are proximate to an intersection defined by a top surface of a cargo deck and an interior surface of a wall of the cargo carrier.

3. The protective device of claim 2, wherein the reinforcement portion is removable from the deflective portion.

4. The protective device of claim 3, wherein the reinforcement portion includes a single triangular shaped piece.

5. The protective device of claim 3, wherein the reinforcement portion includes a plurality of horizontal linear segments.

6. The protective device of claim 3, wherein the reinforcement portion includes a plurality of vertical linear segments.

7. The protective device of claim 1 further comprising a support portion that extends in a substantially horizontal direction from the second end of the deflective portion thereby forming an L-shape.

8. The protective device of claim 7, wherein the reinforcement portion resides on the support portion and is removable from the deflective portion.

9. The protective device of claim 8, wherein the reinforcement portion includes a single triangular shaped piece.

10. The protective device of claim 1, wherein the beveled part and the convex part are configured to engage a rubber portion of a fork-lift tire and deflect the fork-lift tire away from an interior surface of a wall of the cargo carrier.

11. The protective device of claim 1 further comprising a linear portion having a first end and a second end, wherein the first end of the linear portion is attached to the first end of a curved portion, wherein the linear portion extends upward from the deflective part along an interior surface of a wall of the cargo carrier.

12. A protective liner for a cargo carrier comprising:
a first portion that extends along an interior surface of the wall of the cargo carrier and having a first end and a second end; and
a second portion disposed proximate to an intersection between a top surface of a cargo deck and the interior surface of the wall of the cargo carrier and having a curved portion and a support portion,
wherein the curved portion includes a first end removably attached to the second end of the first portion.

13. The protective liner of claim 12, wherein the support portion includes a plurality of segments attached to a second end of the curved portion.

14. The protective liner of claim 13, wherein the plurality of segments are removably attached to the second end of the curved portion.

15. The protective liner of claim 12, wherein the support portion includes a plurality of segments integrated with the second portion.

16. The protective liner of claim 12, wherein the support portion includes a plurality of segments that form an S-shape.

17. The protective liner of claim 12, wherein the support portion includes a plurality of segments that form a continuous U and upside down U-shape.

* * * * *